Dec. 1, 1936. C. C. HAMBY 2,062,902
SWING HANGER
Filed June 4, 1935
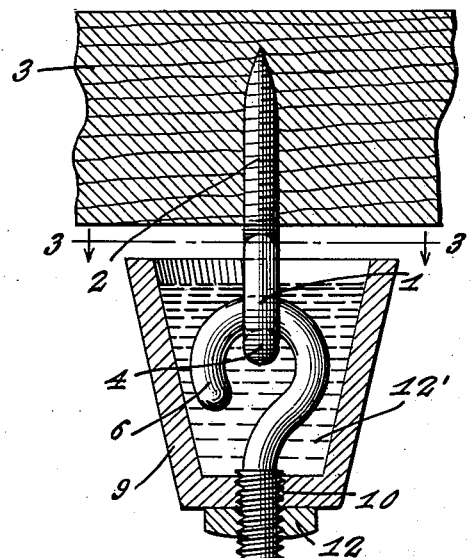
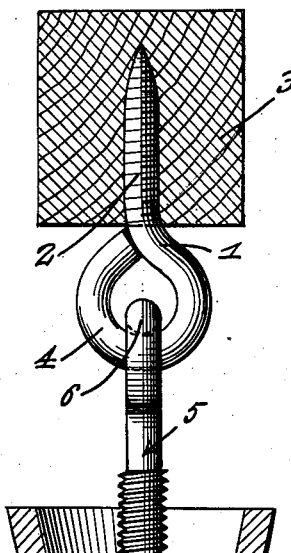
Fig.1.  Fig.2.
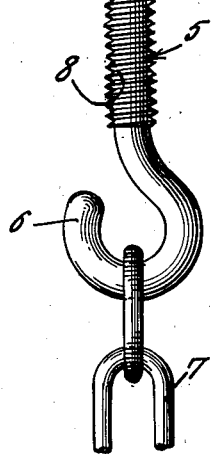
Fig.3.
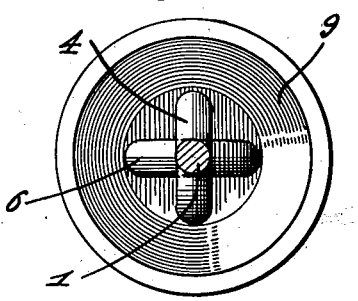
Cleo C. Hamby, INVENTOR
BY Victor J. Evans & Co.
ATTORNEY Patented Dec. 1, 1936

2,062,902

UNITED STATES PATENT OFFICE 2,062,902

SWING HANGER

Cleo C. Hamby, Covington, Ga.

Application June 4, 1935, Serial No. 24,934

1 Claim. (Cl. 248—341)

My invention relates to lubricated supporting hooks for suspending a swing, hammock, or the like from a fixed support.

Devices of this character as heretofore constructed are open to the objection that they embody a lubricant container which interferes with their attachment to a support so that this operation is difficult and cannot be quickly performed. Moreover, such devices require the use of a tool to attach the same.

Having the foregoing in mind, the principal object of my invention is to provide a simply constructed lubricated supporting hook, for the purpose above set forth, particularly designed for quick and easy attachment, without the use of tools, to a fixed support such as a porch ceiling, rafters, or the like.

Specifically stated, the object of my invention is to provide a lubricated supporting hook comprising interconnected hook and eye members and a lubricant container adapted to surround the hook and eye and movable to clear the same so that hook member may be manipulated against the eye member to attach the same to a fixed support.

Another object is to provide a threaded rod having a hook at each end, a screw eye interlocked with the upper hook for attaching the same to a support, and a grease cup screw threadedly engaged with the rod and adapted to be screwed upwardly or downwardly on the rod without disturbing the position of the rod or the swing to be supported thereby, the grease cup when in its upper position surrounding the upper hook and the eye of the screw eye and preventing disengagement of the same, and when in its lower position being unobstructed by the upper hook and said eye whereby it may be replenished with grease.

To the accomplishment of the above and subordinate objects presently appearing, a preferred embodiment of my invention has been illustrated in the accompanying drawing and will now be described in detail and defined in the appended claim.

In said drawing:

Figure 1 is a view partly in section and partly in elevation illustrating a supporting hook constructed according to my invention.

Figure 2 is a similar view showing the lubricating cup in its clear position, and Figure 3 is a view in transverse section taken on the line 3—3 of Figure 1.

Referring to the drawing, 1 designates the usual eye member having a threaded shank portion 2 for attachment to a fixed support 3 and provided with an eye member 4, and 5 designates a hook member provided with hooks 6 at its opposite ends, one for connection and disconnection to the eye 4 and the other for connection to a swing or hammock (not shown) as by the chain 7. The hook member 5 is formed with a straight intermediate threaded portion 8 on which is mounted a cup 9 preferably of the shape indicated and having a threaded bore 10 formed in its bottom wall for cooperation with said threaded portion 8. A jam nut 12 is provided on said portion 8 for manipulation against the bottom wall of said cup to clamp the latter to said hook 5 and to prevent leakage through the bore 10. Cup 9 is designed to contain any suitable grease or oil, represented at 12', for lubricating the hook and eye 5 and 4.

By manipulating the nut 12 and cup 9 the latter may be moved into a position surrounding the connected hook and eye 5 and 4 or to clear the same. In the clear position of the cup member 9, shown in Figure 2, the hook member 5 may be readily swung into angular relation to the eye member 1 and manipulated thereagainst to screw the same into support 3 or said member 5 may be disconnected from the member 1 so that the latter may be permanently secured to said support. In its surrounding position the cup member 9 blocks disconnection of the hook member 5 from the eye 4 by virtue of the fact that said member is formed with an inside diameter such that its side wall prevents the hook member from moving completely out of said eye.

Although I have described a preferred embodiment of my invention in the foregoing, it is to be understood that changes and modifications may be resorted to within the scope of the appended claim.

What I claim is:

A swing hanger comprising a threaded rod having a hook at each end, a screw eye interlocked with the upper hook for attaching the same to a support, a grease cup screw-threadedly engaged with the rod and adapted to be screwed upwardly or downwardly on the rod without disturbing the position of the rod or the swing to be supported thereby, said grease cup when in its upper position surrounding the upper hook and the eye of the screw eye and preventing disengagement of said upper hook and said eye, said grease cup when in its lower position being unobstructed by said upper hook and said eye whereby it may be replenished with grease, and a lock nut on the threaded rod below the grease cup adapted to be tightened to hold the grease cup stationary on the threaded rod in upper position or in lower position.

CLEO C. HAMBY.